(12) United States Patent
Topham

(10) Patent No.: US 7,805,563 B2
(45) Date of Patent: Sep. 28, 2010

(54) TAPE DRIVE APPARATUS

(75) Inventor: Andrew Topham, Glos (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1553 days.

(21) Appl. No.: 11/117,256

(22) Filed: Apr. 28, 2005

(65) Prior Publication Data

US 2005/0246136 A1 Nov. 3, 2005

(30) Foreign Application Priority Data

Apr. 30, 2004 (GB) .................................. 0409637.6

(51) Int. Cl.
 *G06F 12/00* (2006.01)
(52) U.S. Cl. ...................................... 711/111; 711/115
(58) Field of Classification Search .................. 711/111
 See application file for complete search history.

(56) References Cited

U.S. PATENT DOCUMENTS

| | | | |
|---|---|---|---|
| 5,748,889 A | 5/1998 | Weinblatt et al. | |
| 6,625,732 B1 | 9/2003 | Weirauch et al. | |
| 7,219,267 B2 * | 5/2007 | Gibble et al. | ................. 714/42 |
| 2003/0126360 A1 * | 7/2003 | Camble et al. | ............. 711/114 |
| 2003/0145215 A1 | 7/2003 | Dohi | |
| 2003/0179485 A1 * | 9/2003 | Kato et al. | .................... 360/69 |
| 2003/0237022 A1 * | 12/2003 | Thayer | ....................... 714/20 |

FOREIGN PATENT DOCUMENTS

| | | |
|---|---|---|
| EP | 1 073 053 A | 1/2001 |
| EP | 133352 A2 | 8/2003 |

OTHER PUBLICATIONS

GB Search Report dated Jun. 28, 2004.

* cited by examiner

*Primary Examiner*—Jack A Lane

(57) ABSTRACT

The present disclosure provides embodiments of tape drive systems and methods. Briefly described, in architecture, one embodiment of a tape drive apparatus includes an interface for receiving a media access request and a unique identifier of a requestor. The tape drive apparatus also includes a data transfer apparatus for transferring data between a loaded tape cartridge and the tape drive apparatus. The data transfer apparatus is adapted to write a log entry to a log stored in a non-volatile memory of the tape cartridge, where the log entry includes at least the unique identifier. Other systems and methods are also provided.

24 Claims, 4 Drawing Sheets

| WWN | Timestamp | Number of Data Blocks |
|-----|-----------|----------------------|
|     |           |                      |
|     |           |                      |
|     |           |                      |
|     |           |                      |
|     |           |                      |
|     |           |                      |
|     |           |                      |

TAPE DRIVE APPARATUS

TECHNICAL FIELD

The present disclosure relates to the field of data archiving, data backup and recovery.

CLAIM TO PRIORITY

This application claims priority to copending United Kingdom utility application entitled, "TAPE DRIVE APPARATUS," having serial no. GB 0409637.6, filed Apr. 30, 2004, which is entirely incorporated herein by reference.

BACKGROUND

It is known to backup data stored on primary storage, such as a hard disk of a computer system, in order to protect against a disaster that might otherwise irrecoverably destroy all or part of the data. Disasters, for example, may be fire, flood, computer virus or simply accidental deletion of data. One of the main reasons for using magnetic tape as a backup storage media is that it provides a stable, reliable and relatively cheap option for storing large volumes of backed-up data.

Backup application software which executes on a computer system typically provides the functions for enabling such computer system data to be both backed-up to, and restored from tape cartridge, which is written to and read from by a tape drive. Well-known backup application software includes 'Replica' from Stac, 'ArcServe' from Computer Associates, 'BackupExec' from Veritas and 'Data Protectortm' from HP. Well-known tape drives include DDS and LTO compliant tape drives, both available from HP.

An example of a technology that can be used for backup is the linear tape-open (LTO) technology. LTO technology is an "open format" technology, which means that users can have multiple sources of cartridges and compatible tape drives. The ULTRIUM format is the "high capacity" implementation of LTO technology.

Tape drives and tape cartridges which are compliant with ULTRIUM LTO are commercially available from Hewlett Packard and others. A LTO compliant cartridge has a non-volatile cartridge memory (LTO-CM) which is an intelligent memory chip embedded in the cartridge. It uses a radio frequency interface that eliminates the need for a physical power or signal connection between cartridge and tape drive. The LTO-CM is used for storing information which in other tape formats may be stored in the header at the beginning of the tape.

Backup data may be sensitive and thus must be protected from unauthorised access. U.S. Pat. No. 5,659,614, incorporated herein by reference, shows a system for creating and storing a backup copy of file data that relies on encryption. The files that are to be transmitted to the backup site are encoded and double encrypted. All instances of pre-determined client-specific data elements within each file are identified and replaced by a corresponding code prior to encryption. The file data is then encrypted using multiple, indirect encryption keys, variable block length and variable algorithms based on a client-selected string of characters. The files are thereafter encrypted again at the client's site prior to transmission to the backup site.

U.S. Pat. No. 6,574,733, incorporated herein by reference, shows a similar centralised backup system that also relies on encryption. The centralised data backup system pools information to be backed up from one or more data sources. A processor centrally initiates extraction of data to be backed up from a plurality of processing nodes. The processor employs a backup data encryptor that encrypts the centrally extracted data using a public key based cryptographic system. The symmetric key is wrapped using the public encryption key of the data source.

U.S. Pat. No. 6,625,732 B1, incorporated herein by reference, shows a method for tracking the devices used to load, read and write removable storage media. The drive identifier of the drive that is used to perform a read or write access to the removable storage media is written to an access audit table. This enables a computer operator to determine for a particular medium, a list of the different drives in which the medium has been accessed and the sequential order of drives into which the medium has been accessed. This information may be useful to determine whether the data on the medium may have been modified or read by unauthorized persons.

SUMMARY

Embodiments of the present disclosure provide tape drive systems and methods. Briefly described, in architecture, one embodiment of a tape drive apparatus includes an interface for receiving a media access request and a unique identifier of a requestor. The tape drive apparatus also includes a data transfer apparatus for transferring data between a loaded tape cartridge and the tape drive apparatus. The data transfer apparatus is adapted to write a log entry to a log stored in a non-volatile memory of the tape cartridge, where the log entry includes at least the unique identifier.

Embodiment of the present disclosure can also be viewed as providing tape drive methods. In this regard, one embodiment of a method for generating an audit log, among others, can be broadly summarized by the following steps: receiving a media access request and a unique identifier of a requestor; and writing a log entry to a log stored in a non-volatile memory of a tape cartridge, the log entry comprising at least the unique identifier.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

In the following, various embodiments of the present disclosure will be described, by way of example only, and with reference to the drawings in which:

FIG. 6 shows one embodiment of a log for recording the WWNs of media access requests received by the tape drive.

DETAILED DESCRIPTION

Figure 1:
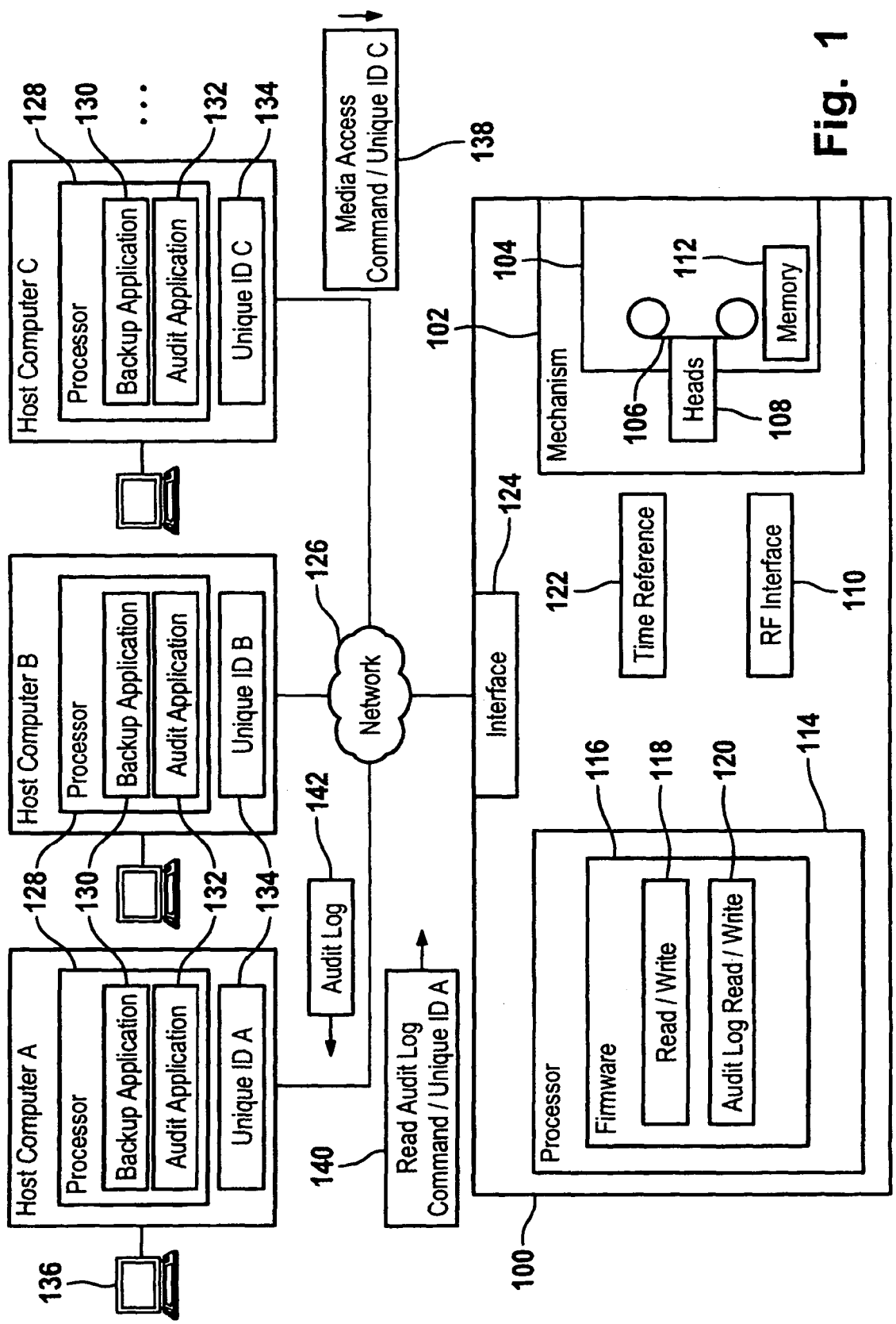
FIG. 1 is a schematic block diagram showing a tape drive coupled to multiple host computers via a network.

In accordance with various embodiments, there is provided a tape drive apparatus comprising an interface for receiving a media access request and a unique identifier of a requester. The tape drive apparatus has a data transfer apparatus for transferring data between a loaded tape cartridge and the tape drive apparatus. The data transfer apparatus is adapted to write a log entry to a log stored in a non-volatile memory of the tape cartridge. The log entry comprises at least the unique identifier of the requester.

This is particularly advantageous for recording the history of media access requests that have been received by the tape drive apparatus. In particular, the log facilitates reviewing the history of such media access requests for identification of media access requests that have been received from unknown, unauthorised and/or untrustworthy requesters. If a suspicious request is recorded in the log, a user may decide not to use the respective backup data as it might have been intentionally or unintentionally corrupted. This is especially useful for protection against acts of sabotage.

The log also facilitates detection of unauthorized read media access requests. This facilitates detection of confidentiality breaches or attempts to read confidential data without permission. A media access request can refer to backup or archive data stored on the tape media of the tape cartridge.

In accordance with one embodiment, the log entry comprises additional information such as a time stamp and/or the number of data blocks to which a recorded media access request has related. Such additional information can be useful for reviewing the log and to provide a basis for a user's decision whether to use the backup/archive data or not.

In accordance with a further embodiment, the log is stored on the tape media of the tape cartridge. For example, a predefined location on the tape media is used for storage of the log.

In accordance with a further embodiment, the tape cartridge has an associated integrated circuit memory, such as a cartridge memory. Using the integrated circuit memory for storing the log has the advantage of increased speed of access in comparison with usage of the tape media.

In accordance with a further embodiment, the interface of the tape drive apparatus is compliant with the FibreChannel (FC) standard. This facilitates coupling of the tape drive apparatus to a storage area network (SAN) as FC is typically used as a communication protocol in a SAN. In the case of a SAN, the worldwide names (WWN) of the host computers can be used as the unique identifiers for generating the log entries. Alternatively, another interface technology that uses similar unique identifiers as FibreChannel is used, e.g. Ethernet.

It is to be noted that embodiments of the present disclosure are not limited to tape storage technology but that it can be used for other kinds of sequential storage devices that use a sequential storage media for writing and reading of data, such as backup or archive data.

In another aspect, various embodiments of the present disclosure relate to a computer system, such as a host computer or media server computer, coupled to a tape drive apparatus. The computer system has a processor for execution of an audit application program and an interface for sending a read request to the tape drive apparatus. In response to the read request that is sent to the tape drive apparatus, the computer system receives the audit log that is stored in the non-volatile memory of the tape cartridge loaded in the tape drive apparatus. The audit application program reads the log entries from the received audit log in order to facilitate a user's decision whether to use or not to use the tape cartridge. Alternatively, this process can be performed automatically such that the audit application program matches the audit log entries against a table of known "friendly" hosts in order to display violations.

In still another aspect, various embodiments of the present disclosure relate to a computer program product operable to send a read request to a tape drive apparatus for reading a log stored in non-volatile memory of a tape cartridge. The computer program product receives the log and reads its log entries (e.g. for display to a user). The computer program product can be a stand alone application program or it can form an integral part of a backup or archive application program.

FIG. 1 shows tape drive 100 having tape drive mechanism 102 which loads and ejects tape cartridge 104 and winds tape media 106 of tape cartridge 104 forwards or backwards as required for reading and writing data. In a DDS (Digital Data Storage) tape drive the read/write heads 108 are mounted on a helical scanning drum that rotates to sweep the heads 108 past the tape media 106 in a motion oblique to the direction of travel of the tape media 106. Tape drive 100 has wireless RF interface 110 that serves to communicate with cartridge memory 112 of tape cartridge 104.

Processor 114 of tape drive 100 serves to execute firmware 116. Firmware 116 comprises instructions 118 for writing and reading backup or archive data to and from tape cartridge 104. In addition, firmware 116 comprises instructions 120 for generating, writing, and reading audit log entries. Depending on the implementation, the tape media 106 is used as a non-volatile memory for storage of the audit log. It is, however, preferred in some embodiments, to use cartridge memory 112 as a non-volatile memory for storage of the audit log for increased speed of memory access.

Tape drive 100 has time reference 122. Preferably, in some embodiments, time reference 122 is provided by a real-time clock (RTC). The time is accurately set on this clock at the time of manufacture of the tape drive 100 and typically cannot subsequently be modified in any way. Preferably, in some embodiments, the real-time clock is battery-powered. The instructions 120 can use time reference 122 for time stamping a log entry before it is stored in cartridge memory 112. Tape drive 100 has data interface 124 for coupling tape drive 100 to communication network 126.

A number of host computers A, B, C, etc. are coupled to interface 124 by means of network 126. For example, host computer A has processor 128 for execution of backup and/or archive application program 130 and audit application program 132. Depending on the implementation, audit application program 132 can form an integral part of backup and/or archive application program 130. Alternatively, audit application program 132 is a stand alone program that can be used independently from backup and/or archive application program 130.

Host computer A has storage 134 for storage of a unique identifier that unequivocally identifies host computer A. Host computer A has display 136 for displaying the audit log 142 received by audit application program 132. The other host computers B, C, etc. coupled to interface 124 of tape drive 100 via network 126 are of a similar design as host computer A.

In operation, one or more of the host computers A, B, C, etc. that are coupled to tape drive 100 can send a media access command for write and/or read access to the tape media 106. Without restriction of generality, media access command 138 of host computer C is considered in the following by way of example only.

Media access command 138 contains the unique identifier of host computer C that is stored in storage 134 of host computer C. For example, backup and/or archive application program 130 of host computer C reads the unique identifier of host computer C from storage 134 in order to generate the media access command 138 and send the media access command 138 to the tape drive 100 via network 126.

When the media access command 138 is received by the interface 124 of tape drive 100, the instructions 118 are invoked for execution of the media access command 138. In addition, the instructions 120 are invoked in order to generate an entry into audit log 142.

The audit log 142 is stored in non-volatile memory of tape cartridge 104. For example, a pre-defined storage location of tape media 106 can serve as the non-volatile memory for storage of the audit log 142. In the example considered here, cartridge memory 112 is used as the non-volatile memory for storage of the audit log as this provides faster access times.

The entry into the audit log that is generated by the instructions 120 at least comprises the unique identifier of the host computer C that is received together with media access command 138. Preferably, in some embodiments, the instructions 120 time stamp the entry by means of the current time that is obtained from time reference 122. The entry may contain additional information, such as the number of data blocks for which access is requested, by means of the media access command 138. The entry is entered into the audit log 142 by writing the entry to cartridge memory 112 via RF interface 110.

An additional entry is written into the audit log 142 each time a media access command is received from one of the host computers A, B, C, etc. by interface 124. As a result, the audit log stores the history of past media access commands that are received with respect to tape cartridge 104.

This history of past media access commands can be reviewed by means of audit application program 132. Without restriction on generality, it is assumed in the following, by way of example only, that audit application program 132 is started by a user of host computer A. Alternatively, the audit application program 132 is automatically started by backup and/or archive application program 130.

Audit application program 132 sends read audit log command 140 to tape drive 100 via network 126. By means of the read audit log command 140 audit application program 132 requests the audit log 142 that is stored in cartridge memory 112. Read audit log command 140 comprises the unique identifier of host computer A.

When the read audit log command 140 is received by interface 124 of tape drive 100, this invokes the instructions 120. The instructions 120 execute the read audit log command 140 by reading the audit log 142 stored in cartridge memory 112 via RF interface 110 and returning a copy of the audit log 142 to the requesting host computer A that has sent the read audit log command 140 via network 126.

Audit application program 132 reads the entries of the audit log from the copy of the audit log 142 for display on display 136. The audit log entries displayed on display 136 enable a user to make an informed decision whether to use or not to use the tape cartridge 104.

When the audit log only contains entries that identify known host computers, the user will decide that everything is in order. However, if one or more media access commands of an unknown, unauthorized and/or suspicious host computer has been recorded in the audit log, the user may decide that tape cartridge 104 may be corrupted. In this instance, the user can invoke backup and/or archive application program 130 in order to write a fresh backup to tape cartridge 104.

Alternatively, this process is carried out automatically or semi-automatically by using one or more lists of "friendly" host computers, i.e., host computers that are authorized and are considered trustworthy. Such a list can consist of the respective unique identifiers of trusted host computers and can be stored centrally, e.g., on one of the host computers for access by the other host computers or locally on each individual host computer. The audit application program matches the audit log entries against the respective list of known "friendly" hosts in order to display suspicious log entries that can represent actual or attempted violations.

Typically the tape cartridge 104 is used for storage of backup and/or archive data of only a single host computer. In this instance, the audit log only contains entries of this single host computer. In the event that one or more media access commands are recorded that have been received from another host computer, this indicates that the backup data stored on the tape cartridge 104 may be corrupted or sabotaged by storing a computer virus, and/or an unauthorized attempt to read archived confidential data.

Figure 2:
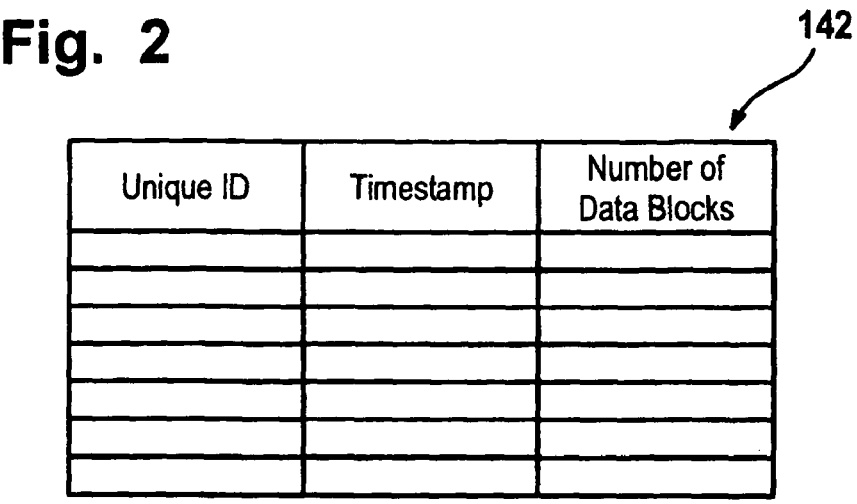
FIG. 2 shows one embodiment of a log for recording media access requests received by the tape drive from the host computers.

FIG. 2 shows one embodiment of audit log 142 of FIG. 1. The audit log 142 has the form of a table. Each row of the table corresponds to one entry into the audit log 142 and comprises the unique identifier of the host computer from which the respective media access command has been received, the time stamp of the entry and/or the number of data blocks to which the media access command has related.

Figure 3:
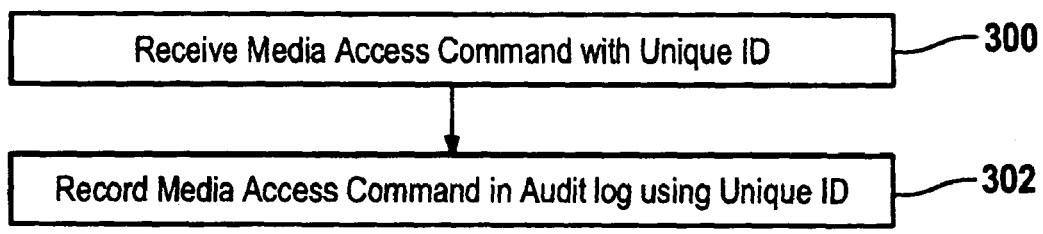
FIG. 3 is a flow diagram illustrating the steps involved in creating a log entry.

FIG. 3 shows a flowchart illustrating generation and storage of an entry of the audit log. In step 300, a media access command is received by the tape drive from one of the host computers coupled to its network interface. The media access command is received together with the unique identifier of the host computer from which the media access command has been sent.

In step 302, the media access command is recorded in the audit log using the unique identifier of the host computer from which the media access command has been received. At least the unique identifier of that host computer is entered into the audit log. Preferably, in some embodiments, additional information such as a time stamp and/or the number of data blocks afflicted by the media access command are stored in the log entry.

Figure 4:
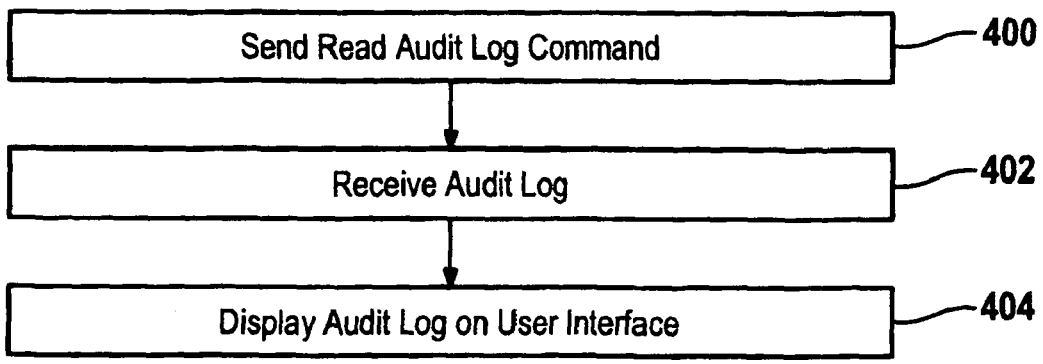
FIG. 4 is a flow diagram illustrating the steps involved in reading the log.

FIG. 4 illustrates a method for using the audit log by an audit application program. In step 400, the audit application program sends a read audit log command to the tape drive. The response received by the audit application program in step 402 comprises a copy of the audit log. The entries of the audit log are displayed on a user interface in step 404. This facilitates a user's assessment on whether the tape cartridge loaded in the tape apparatus might have been sabotaged or not.

Figure 5:
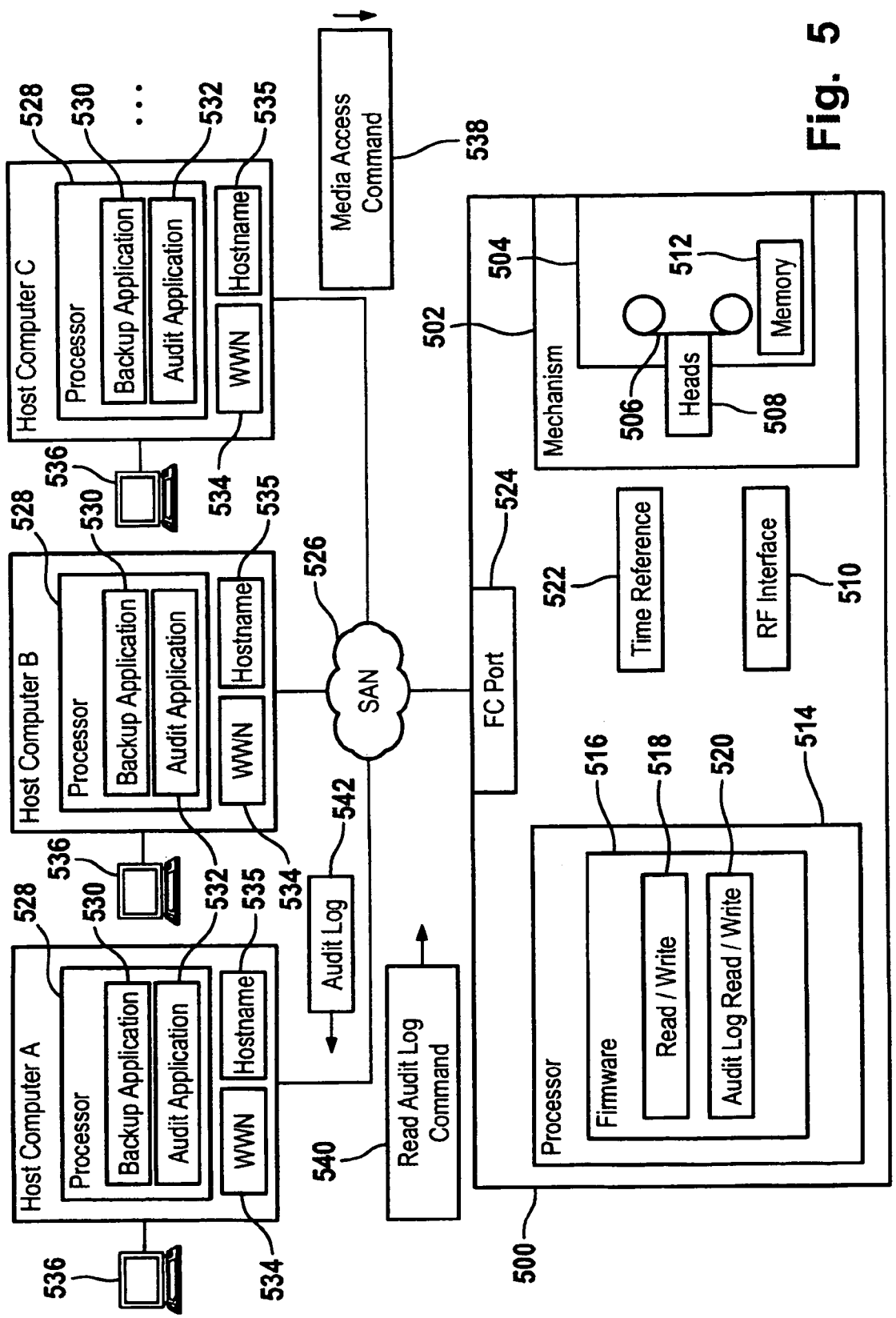
FIG. 5 is a schematic block diagram showing a tape drive coupled to multiple host computer systems via a SAN.

FIG. 5 shows an alternative embodiment. Elements of FIG. 5 that correspond to elements of FIGS. 1 and 2 are designated by like reference numerals having added 400.

In one embodiment considered in FIG. 5, the host computers A, B, C, etc. are coupled to tape drive 500 via SAN 526. Tape drive 500 is coupled to SAN 526 by means of its Fibre-Channel (FC) port 524. The host computers A, B, C, etc. have respective FC ports (not shown in FIG. 5). Each one of the host computers has a unique worldwide name (WWN) which is stored in storage 534. In addition, each one of the host computers A, B, C, etc. can have an assigned host name which is stored in storage 535.

Typically, the WWN of the FC interface of each host port is preassigned at the time of manufacture of the interface, so is a fixed identifier for each FC host port. Note that a host may have multiple FC ports; if there are multiple FC ports, usually each one has a unique WWN. The FC protocol is designed to automatically communicate the WWN of a FC port from which a command is sent as part of the protocol.

In accordance with the FC protocol, the WWN of the sending host computer of a media access command 538 is communicated to the recipient of the media access command 538, i.e. tape drive 500. The WWN is used by the instructions 520 as the unique identifier for creating the log entry into the audit log 542.

Figure 6:
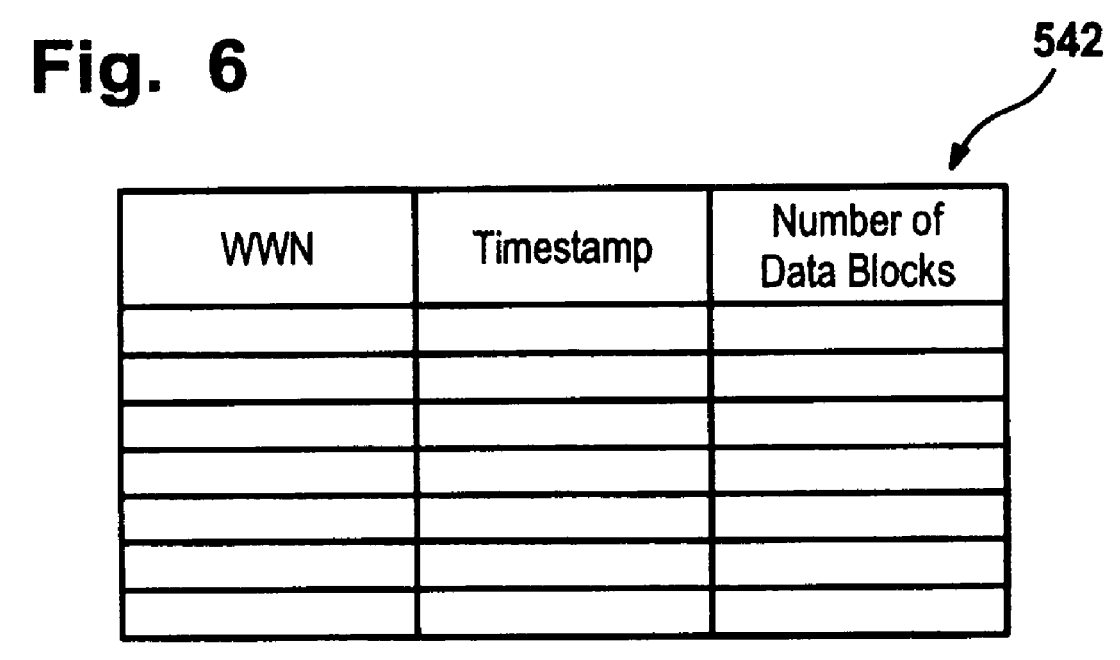

FIG. 6 shows the structure of the resultant audit log 542 where the WWNs of the host computers that send media access commands to the tape drive are used as the unique identifiers.

With reference to the drawings, a list of reference numerals for the drawings is included hereinafter.

LIST OF REFERENCE NUMERALS

100 Tape Drive
102 Tape Drive Mechanism
104 Tape Cartridge
106 Tape Media
108 Heads
110 RF Interface
112 Cartridge Memory
114 Processor
116 Firmware
118 Instructions
120 Instructions
122 Time Reference
124 Interface
126 Network
128 Processor
130 Backup and/or Archive Application Program
132 Audit Application Program
134 Storage
136 Display
138 Media Access Command
140 Read Audit Log Command
142 Audit Log
500 Tape Drive
502 Tape Drive Mechanism
504 Tape Cartridge
506 Tape Media
508 Heads
510 RF Interface
512 Cartridge Memory
514 Processor
516 Firmware
518 Instructions
520 Instructions
522 Time Reference
524 Interface
526 Network
528 Processor
530 Backup and/or Archive Application Program
532 Audit Application Program
534 Storage
536 Display
538 Media Access Command
540 Read Audit Log Command
542 Audit Log
535 Storage

What is claimed is:

1. A tape drive apparatus comprising:
an interface for receiving a media access request and a unique identifier of a requestor; and
a data transfer apparatus for transferring data between a loaded tape cartridge and the tape drive apparatus, the data transfer apparatus being adapted to write a log entry to a log stored in a non-volatile memory of the tape cartridge, the log entry comprising at least the unique identifier.

2. The tape drive apparatus of claim 1, further comprising a time reference for time stamping the log entry.

3. The tape drive apparatus of claim 1, the non-volatile memory being a tape media of the tape cartridge.

4. The tape drive apparatus of claim 1, the non-volatile memory being an integrated circuit memory associated with the tape cartridge.

5. The tape drive apparatus of claim 4, the integrated circuit memory being a cartridge memory.

6. The tape drive apparatus of claim 1, further comprising a wireless interface for writing the log entry.

7. The tape drive apparatus of claim 1, wherein the interface for receiving the media access request is a FibreChannel compliant port and a worldwide name of the requestor is used as the unique identifier.

8. A computer program product stored in memory for controlling a tape drive, the computer program product comprising instructions for:
receiving a media access request and a unique identifier of a requestor; and
writing a log entry to a log stored in a non-volatile memory of a tape cartridge, the log entry comprising at least the unique identifier.

9. The computer program product of claim 8, the log entry further comprising a number of data blocks to which the media access request relates.

10. The computer program product of claim 8, the log entry further comprising a time stamp.

11. A method of generating an audit log comprising:
receiving a media access request and a unique identifier of a requestor; and
writing a log entry to a log stored in a non-volatile memory of a tape cartridge, the log entry comprising at least the unique identifier.

12. The method of claim 11, wherein a worldwide name of the requestor is used as the unique identifier.

13. The method of claim 11, further comprising time stamping of the log entry.

14. A sequential storage apparatus comprising:
means for receiving a request for access to a sequential storage media and a unique identifier of a requestor; and
means for recording the request by storing at least the unique identifier in a non-volatile memory in the sequential storage media.

15. The sequential storage apparatus of claim 14, the means for receiving being adapted to receive a worldwide name of the requestor for usage as the unique identifier.

16. The sequential storage apparatus of claim 14, wherein the requestor is a host computer of a plurality of host computers being coupled to the sequential storage apparatus by a network.

17. A computer system comprising:
a processor for execution of an audit application program; and
an interface for sending a read request from the audit application program to a tape drive apparatus for requesting a read access to an audit log stored in a non-volatile memory of a tape cartridge loaded in the tape drive apparatus, the audit log having at least one log entry comprising at least a unique identifier of a requestor of a previously recorded media access request, the audit application program operable to read the at least one log entry from the audit log.

18. The computer system of claim 17, the audit application program operable to display the audit log for a user's review.

19. The computer system of claim 17, the interface being compliant with a FibreChannel standard.

20. A computer program product stored in memory of a requesting computer operable to:

send a read request for reading an audit log stored in nonvolatile memory of a tape cartridge, the audit log having at least one log entry comprising at least a unique identifier of a requestor of a previously recorded media access request;

receive the audit log; and read the at least one log entry from the audit log.

21. The computer program product of claim 20, operable to display the at least one log entry for a user's review.

22. The computer program product of claim 20, operable to identify suspicious log entries and to display the suspicious log entries.

23. The computer program product of claim 20, being a backup and/or archive application program.

24. The computer program product of claim 20, being an audit application program.

* * * * *